Mar. 6, 1923.
M. KRZEWINSKI
MOTOR VEHICLE
Filed Mar. 24, 1921     4 sheets-sheet 4
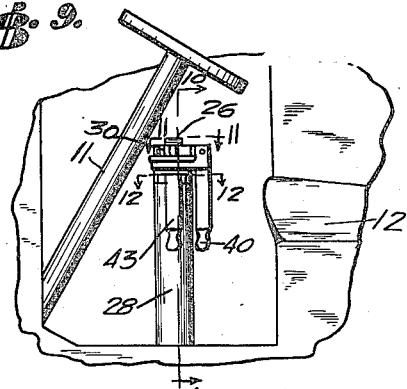
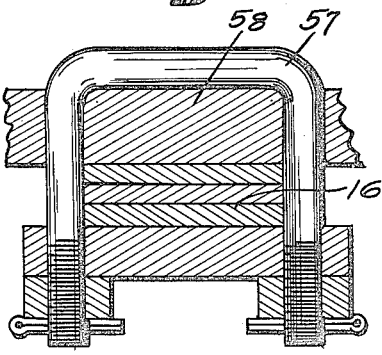
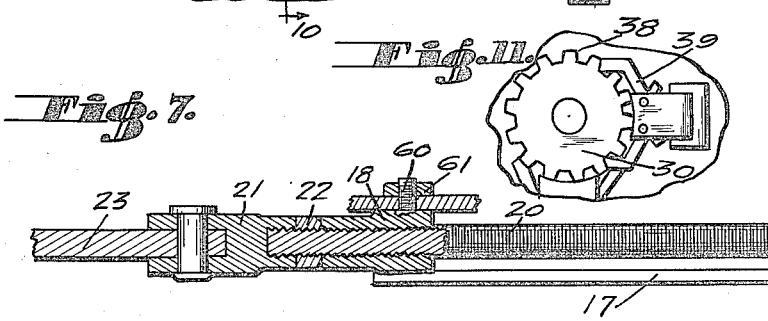
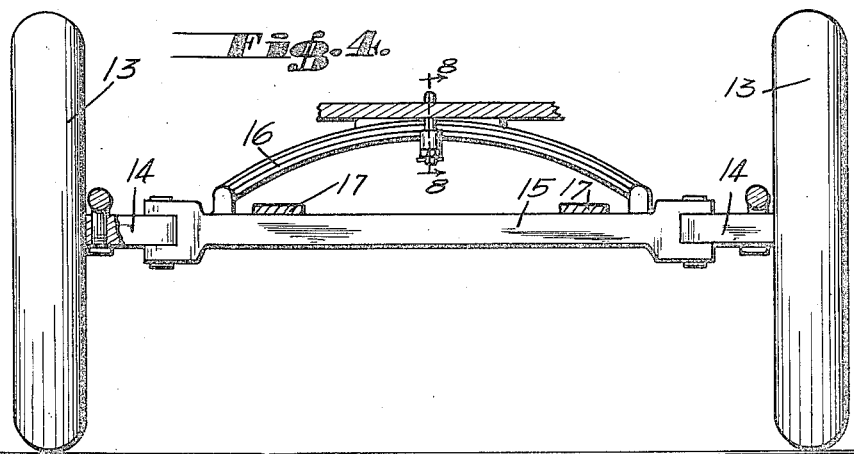
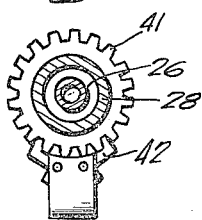
Mikolaj Krzewinski   INVENTOR.
BY *Hazard & Miller*
ATTORNEYS.

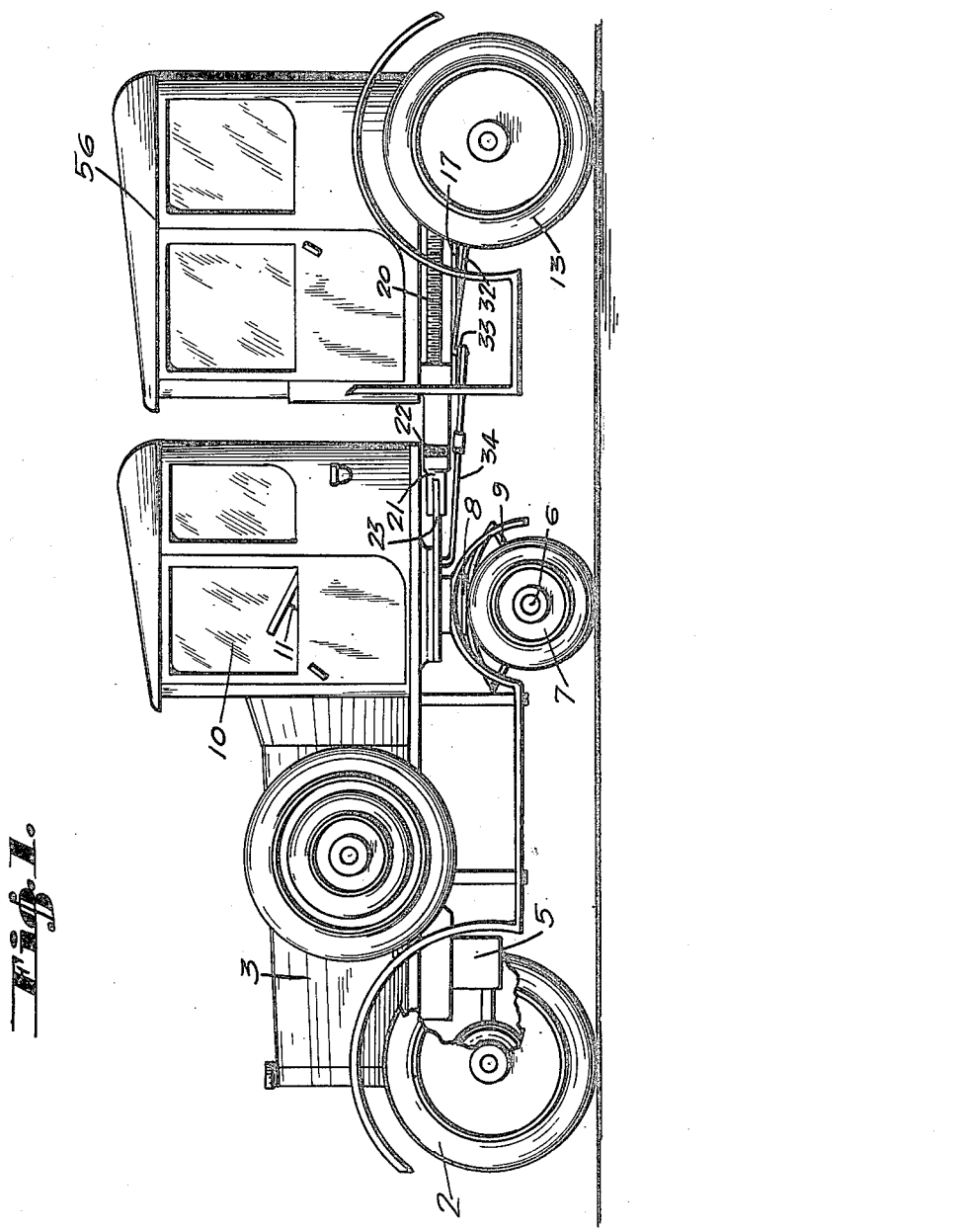

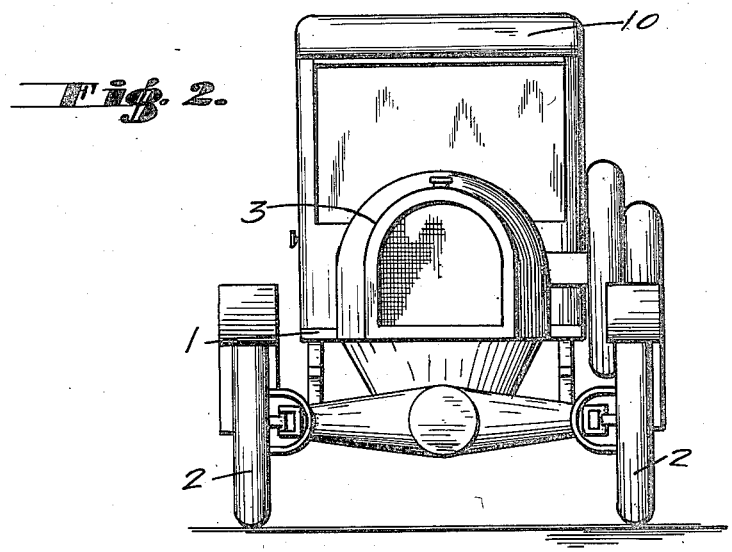
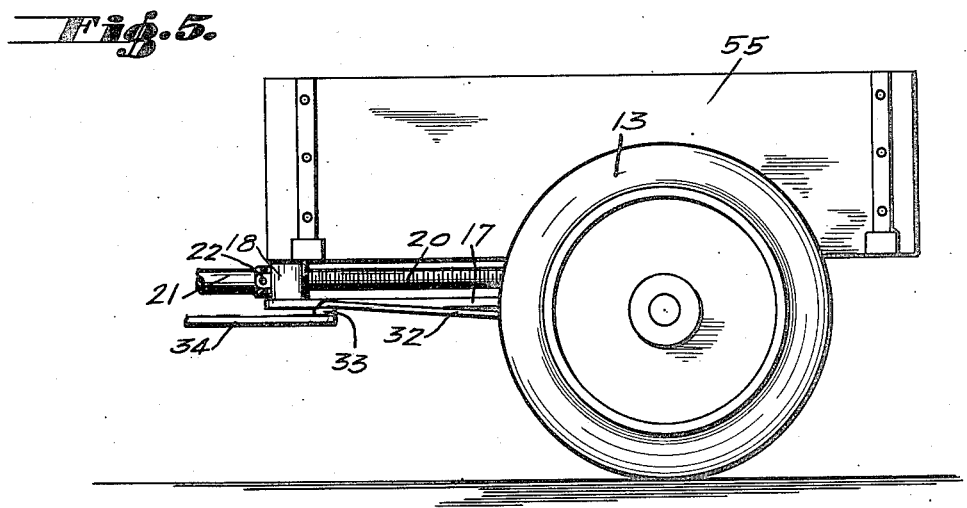

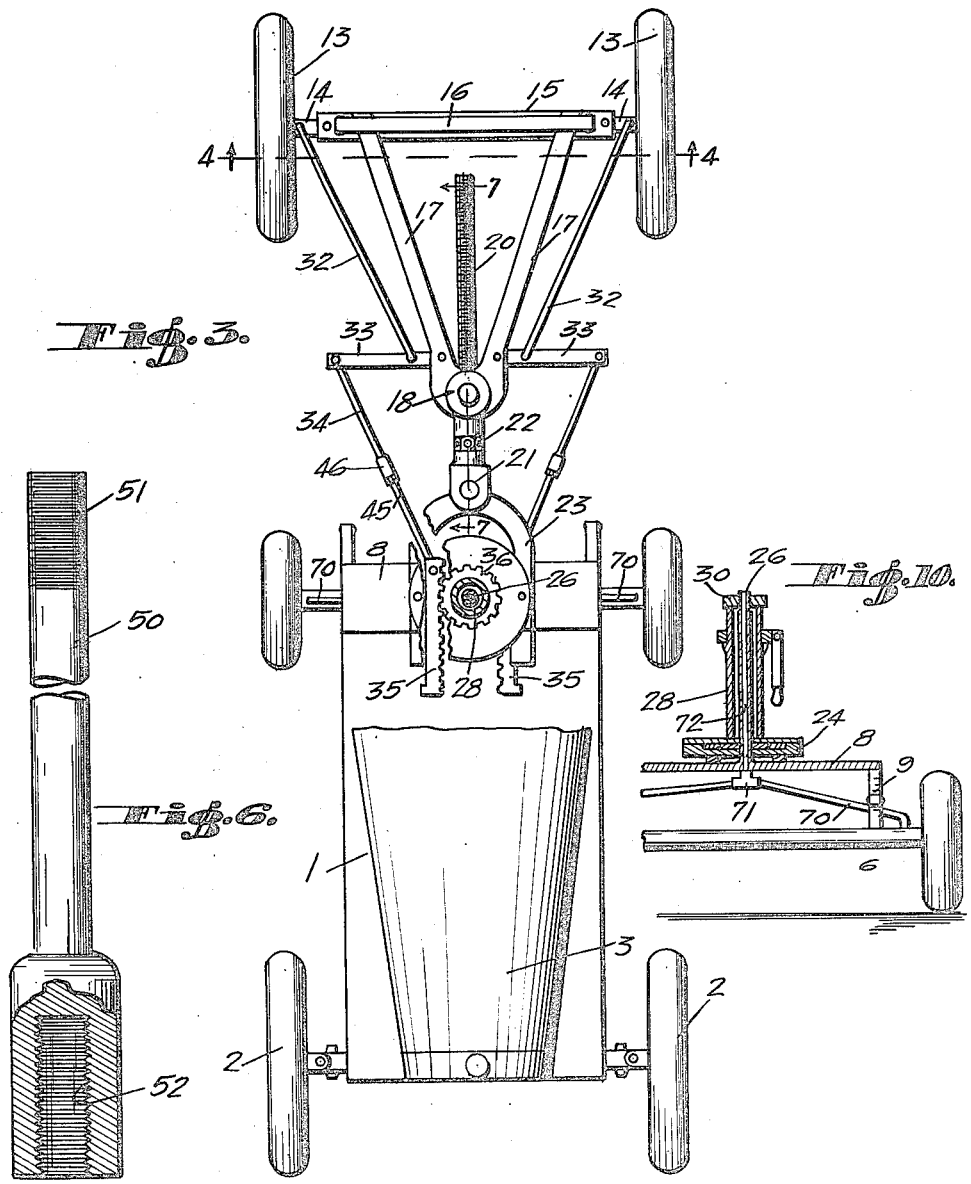

Patented Mar. 6, 1923.

1,447,728

UNITED STATES PATENT OFFICE.

MIKOLAJ KRZEWINSKI, OF LOS ANGELES, CALIFORNIA.

MOTOR VEHICLE.

Application filed March 24, 1921. Serial No. 455,197.

*To all whom it may concern:*

Be it known that I, MIKOLAJ KRZEWINSKI, a citizen of the United States, residing at Los Angeles, in the county of Los Angeles and State of California, have invented new and useful Improvements in Motor Vehicles, of which the following is a specification.

This invention is a motor vehicle provided with a convertible body and comprising essentially a main vehicle having front driving and steering wheels, and a trailer structure detachably connected to the main vehicle and adapted to have any one of various types of bodies mounted thereon, the trailer structure being pivotally connected to the main vehicle and provided with rear steering wheels controlled by an auxiliary steering column placed alongside of the usual steering column for the front driving and steering wheels of the vehicle. The trailer structure is adapted to be locked with relation to the main vehicle so that its steering apparatus becomes inoperative when the vehicle is moving forward, and is also so arranged as to cause the trailer structure to be steered by its steering mechanism when backing the device.

The invention will be readily understood from the following description of the accompanying drawings, in which Figure 1 is a side elevation of a vehicle construction in accordance with the invention.

Fig. 2 is a front elevation of the same.

Fig. 3 is a plan view of the device.

Fig. 4 is a transverse section on the line 4—4 of Fig. 3.

Fig. 5 is a side elevation showing a different type of body mounted upon the trailer structure.

Fig. 6 is an elevation, partly in longitudinal section, of one of the links provided for adjusting the length of the trailer structure.

Fig. 7 is a longitudinal section on the line 7—7 of Fig. 3.

Fig. 8 is a detail section on the line 8—8 of Fig. 4.

Fig. 9 is a side elevation of the steering mechanism for the vehicle.

Fig. 10 is a longitudinal section on the line 10—10 of Fig. 9.

Figs. 11 and 12 are detail sections on the lines 11—11 and 12—12 of Fig. 9.

The device comprises a main vehicle frame 1 having front steering wheels 2 which also form drive wheels. The engine of the vehicle is mounted beneath usual hood 3 at the front of the vehicle frame, and a usual drive is provided between the engine and the front steering wheels, said drive mechanism being shown as contained within casing 5. A rear axle 6 is provided for the main vehicle frame, and said axle is provided with rear wheels 7 and supports a transverse frame 8 upon usual springs 9. A body of any desired design, such as shown at 10, is mounted upon the main vehicle frame, and a usual steering column 11 is provided adjacent the driver's seat 12 for controlling the front steering wheels in usual manner.

The trailer structure connected to the main vehicle frame includes rear wheels 13 mounted upon steering knuckles 14 connected to a rear axle 15 in usual manner. This rear axle carries a transverse spring 16, and reach rods 17 extend forwardly from the axle 15 and terminate in a bearing member 18. This bearing member is adjustably and detachably connected to the transverse frame 8 of the main vehicle frame.

For this purpose a rod 20 is threaded through bearing 18 and into a bearing 21 with a lock nut 22 threaded upon said rod between the bearings 18 and 21 in order to lock rod 20 in longitudinally adjusted position with relation to bearing 18 and the supporting axle and wheels of the trailer structure. The bearing 21 terminates in a forwardly projecting forked member 23 resting upon the transverse frame 8 and carrying the plate 24.

The trailer structure is pivotally connected with relation to the main vehicle frame by means of a shaft 26 extending upwardly from transverse frame 8 through the plate 24. This pivotal connection may be locked so as to secure the trailer structure rigidly to the main vehicle frame. For this purpose a column 28 is received over shaft 26, and a brake nut 30 is adapted to be threaded down onto the end of the shaft so as to force sleeve 28 downwardly and thereby clamp pivot plate 24 and the forked bearing secured to the same with relation to transverse frame 8.

The steering of the wheels 13 is accomplished through links 32 connected to the respective steering knuckles 14 and secured at their opposite ends to levers 33 pivoted to and extending laterally from bearing member 18. The ends of these levers are in turn connected by links 34 to racks 35 moving in a guideway provided in pivot plate 24 at the respective sides of shaft 26. A gear wheel 36 meshing at the opposite sides of the respective racks is journaled upon shaft 26 and is fixed for rotation with sleeve 28.

When the vehicle is moving forward, the steering mechanism for rear wheels 13 is preferably locked by clamping sleeve 28 to transverse frame 8, as previously described, so that rotation of said sleeve, in order to actuate racks 35 and thereby operate the connections to steering knuckles 14, is prevented.

The nut 30 is preferably actuated through a double pawl and ratchet mechanism including ratchet teeth 38 upon the nut, and a double pawl 39 engaging the same and operated by a handle 40 preferably pivoted to the pawl. When sleeve 28 is unclamped so that the rear steering wheels may be operated, as in backing the vehicle, the sleeve is preferably rotated by a double pawl and ratchet mechanism including a ratchet wheel 41 upon the sleeve operated by a double pawl 42 provided with a pivot handle 43.

In order that the trailer structure, as thus described, may be readily detached when it is desired to use only the main vehicle, the links 34 preferably include detachable members comprising threaded rod ends 45 receiving co-operating rod end sections 46. It will thus be seen that by disconnecting the links 34 and also disconnecting rod 20 from the bearing 21 that the main vehicle forms a complete structure without the trailer mechanism.

It will be noted that rod 20 is made relatively long so that the trailer structure may be lengthened as desired, and in order to maintain the steering connections provided by links 34 when the trailer is thus elongated, rods 50 provided with threaded ends 51 and with threaded socket ends 52 are preferably arranged to be interposed in the lengths of links 34 as by attaching the ends of said rods to the socket ends 46 and the threaded ends 45 of the link members respectively.

It will be noted that the auxiliary steering column provided upon transverse frame 8 is so positioned with relation to the body 10 upon the main vehicle frame, that said auxiliary steering device will be positioned within the body 10 adjacent the steering column 11 and therefore convenient to the drive of the machine.

It will be understood that various types of bodies may be mounted upon the trailer structure, and said bodies are adapted to be readily interchanged. For this purpose either a freight carrying body 55, such as shown in Fig. 5, or a passenger body 56, such as shown in Fig. 1, may be mounted upon the trailer structure.

The body is detachably mounted upon the trailer structure by providing a usual attaching clip 57 upon rear spring 16 and engaging the base 58 of whichever body is positioned upon the trailer. The front portion of base 58 of the body upon the trailer is preferably secured to bearing member 18 as by providing the latter with a bolt 60 extending through base 58 with a usual retaining nut 61 upon said bolt.

It will be noted that the structure, as thus set forth, provides a device in which either the main vehicle may be employed alone, or said main vehicle may have a trailer structure of adjustable length secured thereto with various interchangeable bodies mounted upon the trailer structure. The device also provides for either independent steering of the wheels of the trailer structure, or for locking the trailer structure rigidly with relation to the main vehicle so that steering may be accomplished only through the front steering and driving wheels of the main vehicle. It will also be observed that the improved construction provides for pivotal movement of the entire trailer structure when so desired with relation to the main vehicle.

It will be understood that the vehicle, as thus constructed, may be provided with a suitable lubricating system for the bearings of the device, and this lubricating system may include lubricating means for wheels 7 including lubricating pipes 70 arranged beneath the transverse plate 8 and communicating with the bearings for the respective wheels 7. These lubricating pipes unite in a T 71 which preferably communicates with the hollow interior 72 of shaft 26 which thus forms a reservoir for the lubricant. It will be understood that, if desired, other supply pipes for the lubricant may extend from T 71 to other points upon the device which it is desired to lubricate.

Various changes may be made without departing from the spirit of the invention as claimed.

What is claimed is:

1. A motor vehicle having a trailer, means for adjusting the length of said trailer, said trailer including wheels mounted for steering, a steering column arranged upon said vehicle and having link connection with said trailer steering wheels, and means for adjusting the length of said link connection.

2. A motor vehicle having a trailer, said trailer including wheels mounted for steering, a steering column upon said vehicle having steering and pivoting connection with said trailer steering wheels, and means on said column for locking said connection and said trailer steering wheels against steering movement.

3. A motor vehicle having a trailer, and a pivotal and steering connection between said vehicle and trailer, including a shaft extending upwardly from said vehicle and journaled in a bearing at the forward end of said trailer, a pinion on said bearing, racks engaging said pinion, and links connecting said racks and the trailer wheels.

4. A motor vehicle having a trailer, a pivotal connection between said vehicle and trailer including a hollow shaft extending upwardly from said vehicle and journaled in a bearing at the forward end of said trailer, said hollow shaft forming a lubricant reservoir, and connections from said reservoir to the bearings of said vehicle.

In testimony whereof I have signed my name to this specification.

MIKOLAJ KRZEWINSKI.